(12) United States Patent
Chen et al.

(10) Patent No.: US 11,068,336 B2
(45) Date of Patent: Jul. 20, 2021

(54) GENERATING ERROR CHECKING DATA FOR ERROR DETECTION DURING MODIFICATION OF DATA IN A MEMORY SUB-SYSTEM

(71) Applicant: Micron Technology, Inc., Boise, ID (US)

(72) Inventors: Ning Chen, San Jose, CA (US); Juane Li, Milpitas, CA (US); Fangfang Zhu, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 83 days.

(21) Appl. No.: 16/510,591

(22) Filed: Jul. 12, 2019

(65) Prior Publication Data
US 2021/0011800 A1    Jan. 14, 2021

(51) Int. Cl.
*G06F 11/00* (2006.01)
*G08C 25/00* (2006.01)
*H03M 13/00* (2006.01)
*H04L 1/00* (2006.01)
*G06F 11/10* (2006.01)
*G06F 3/06* (2006.01)

(52) U.S. Cl.
CPC ........ *G06F 11/1004* (2013.01); *G06F 3/0619* (2013.01); *G06F 3/0653* (2013.01); *G06F 3/0673* (2013.01)

(58) Field of Classification Search
None
See application file for complete search history.

(56) References Cited

U.S. PATENT DOCUMENTS

2018/0062665 A1* 3/2018 Guyot ................ G06F 11/1004

* cited by examiner

*Primary Examiner* — Guerrier Merant
(74) *Attorney, Agent, or Firm* — Lowenstein Sandler LLP

(57) ABSTRACT

A request to store a first data is received. The first data and a first error-checking data are received. The first error-checking data can be based on a cyclic redundancy check (CRC) operation of the first data. A second data is generated by modifying the first data. A second error-checking data of the second data is generated by using the first error-checking data and a difference between the first data and the second data.

17 Claims, 6 Drawing Sheets

GENERATING ERROR CHECKING DATA FOR ERROR DETECTION DURING MODIFICATION OF DATA IN A MEMORY SUB-SYSTEM

TECHNICAL FIELD

Embodiments of the disclosure relate generally to memory sub-systems, and more specifically, relate to generating error checking data for error detection during modification of data in a memory sub-system.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
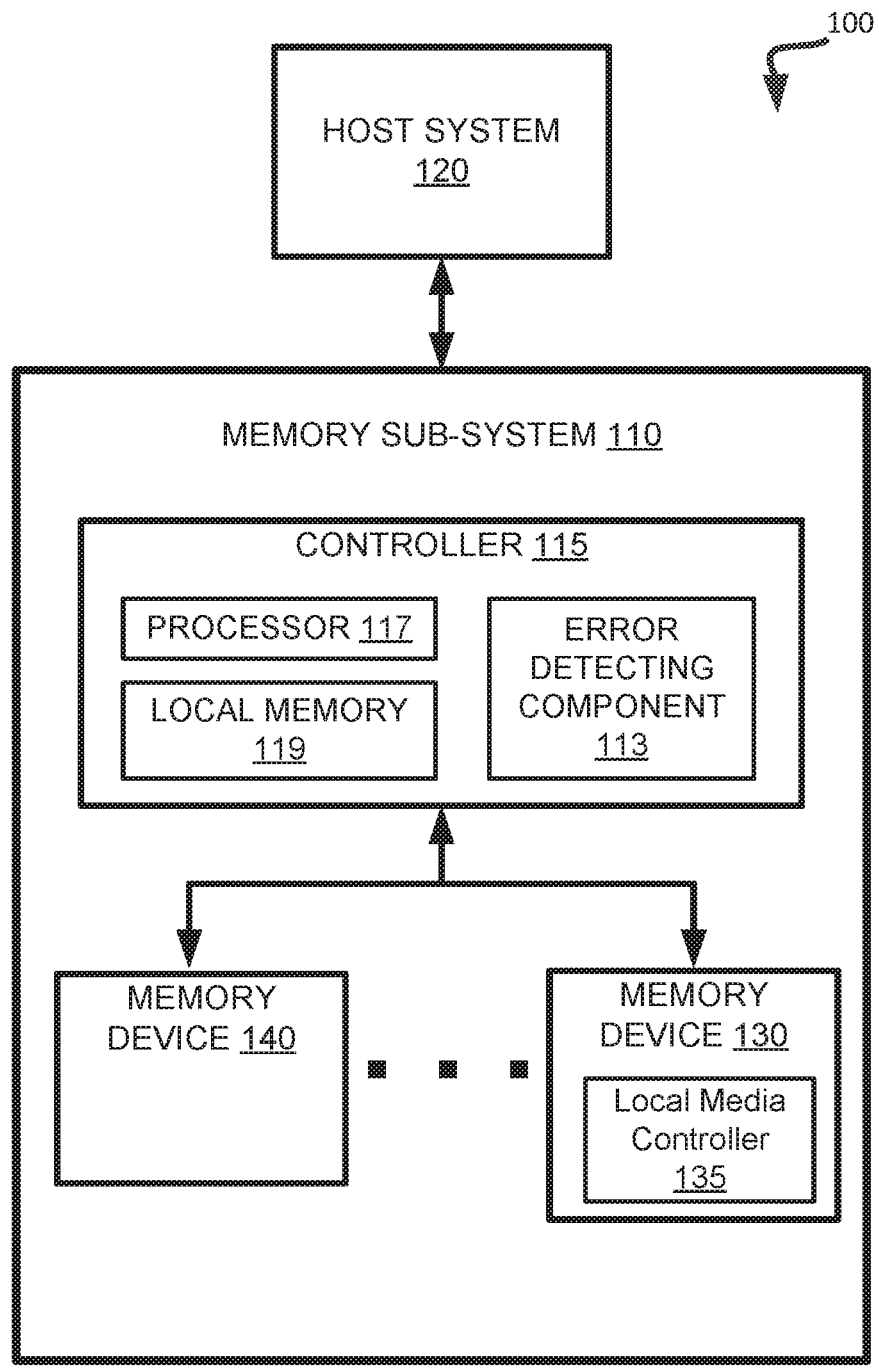
FIG. 1 illustrates an example computing environment that includes a memory sub-system in accordance with some embodiments of the present disclosure.

Aspects of the present disclosure are directed to generating error checking data for error detection during modification of data in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory sub-system can receive a message data appended with a cyclic redundancy check (CRC) code from the host system to store the message data and the CRC code to one or more memory components. At a later time, the memory sub-system can modify the original message data in various ways, such as encrypting or compressing the original message data and/or appending metadata to the original message data. Subsequently, the memory sub-system can store the modified message data with the original CRC code (i.e., the CRC code received from the host system).

At a later time, the host system can request the memory sub-system to access the message data and the CRC code. In response, the memory sub-system can retrieve the modified message data and obtain the original message data from the modified message data. Then, the memory sub-system can provide the requested message data with the original CRC code to the host system. Accordingly, the host system can use the original CRC code and the retrieved message data to check whether the retrieved message data is corrupted or contains an error. For example, the host system can generate a new CRC code from the retrieved message data) and can compare the new CRC code with the original CRC code. If the two CRC codes match, then the host system can determine that the retrieved message data is valid (i.e., same as the original message data requested to be stored). On the other hand, if the two CRC codes do not match, then the host system can determine that the retrieved data is corrupted. In some cases, the memory sub-system, instead of the host system, can validate integrity of the original message data using the new CRC code and the original CRC code.

Conventionally, the memory sub-system stores the original CRC code with the message data modified by encryption, compression, and/or appending metadata in order to validate the retrieved message data (i.e., the message data changed back from the modified message data). Since the memory sub-system should store the original CRC code for the host system upon a request to retrieve the message data, the memory sub-system cannot check whether and/or where an error has been introduced when the message data was modified. For example, an error can be introduced during the modification (e.g., encryption) or the reverse-modification (or unmodification) (e.g., decryption), where the data size remains the same. In order to check for such an error, the memory sub-system needs a CRC code that corresponds to the modified or unmodified message data so that the memory sub-system can compare the corresponding CRC code with a new CRC code generated based on the modified or unmodified message data. If the two CRC codes are the same, then the memory sub-system can determine that no error was introduced during the modification(s). However, if the memory sub-system replaces the original CRC code with the CRC code for the modified or unmodified message data, then the retrieved message data cannot be validated. As such, the conventional memory sub-system cannot identify whether and/or where an error is introduced when storing and retrieving a message data for the host system.

Aspects of the present disclosure address the above and other deficiencies by having a memory sub-system that generates an error checking data (e.g., a CRC code) at each modification (e.g., encryption, compression, appending metadata, decryption, decompression, and/or truncation) performed on data received from the host system during storing and/or retrieving the data. According to the aspects of the present disclosure, for storing the data, the memory sub-system generates an error checking data using the data received from the host system, error checking data corresponding to the data, and data generated from modification (e.g., encryption, compression, and/or appending metadata to the original message data from the host system). For retrieving the data, the memory sub-system generates error-checking data using the modified data, the error checking data corresponding to the modified data, and data generated from reverse-modification (e.g., decryption, decompression, and/or truncation).

Advantages of the present disclosure include, but are not limited to, ensuring integrity of data during storing and retrieving by detecting when and/or whether an error is introduced during the storing and retrieving of the data and upon the detection, performing a corrective action (e.g., repeating modification and/or reverse-modification). As a result, the reliability of the memory sub-system can be improved.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells such as single level cells (SLCs) or multi-level cells (MLCs) (e.g., triple level cells (TLCs) or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

The memory sub-system 110 includes an error-detecting component 113 that can be used to generate error-checking data or codes. In some embodiments, the memory sub-system controller 115 includes at least a portion of the error-detecting component 113. For example, the memory sub-system controller 115 can include a processor 117 (processing device) configured to execute instructions stored in local memory 119 for performing the operations described herein. In some embodiments, the error-detecting component 113 is part of the host system 110, an application, or an operating system.

The error detecting component 113 can receive a request to store a message data and a corresponding error-checking data. The error detecting component 113 can generate another message data by modifying the message data. The error detecting component 113 can also generate error-checking data corresponding to the modified message data by using the error-checking data received and a difference between the message data and the modified message data. Further details with regards to the operations of the error detecting component 113 are described below.

Figure 2:
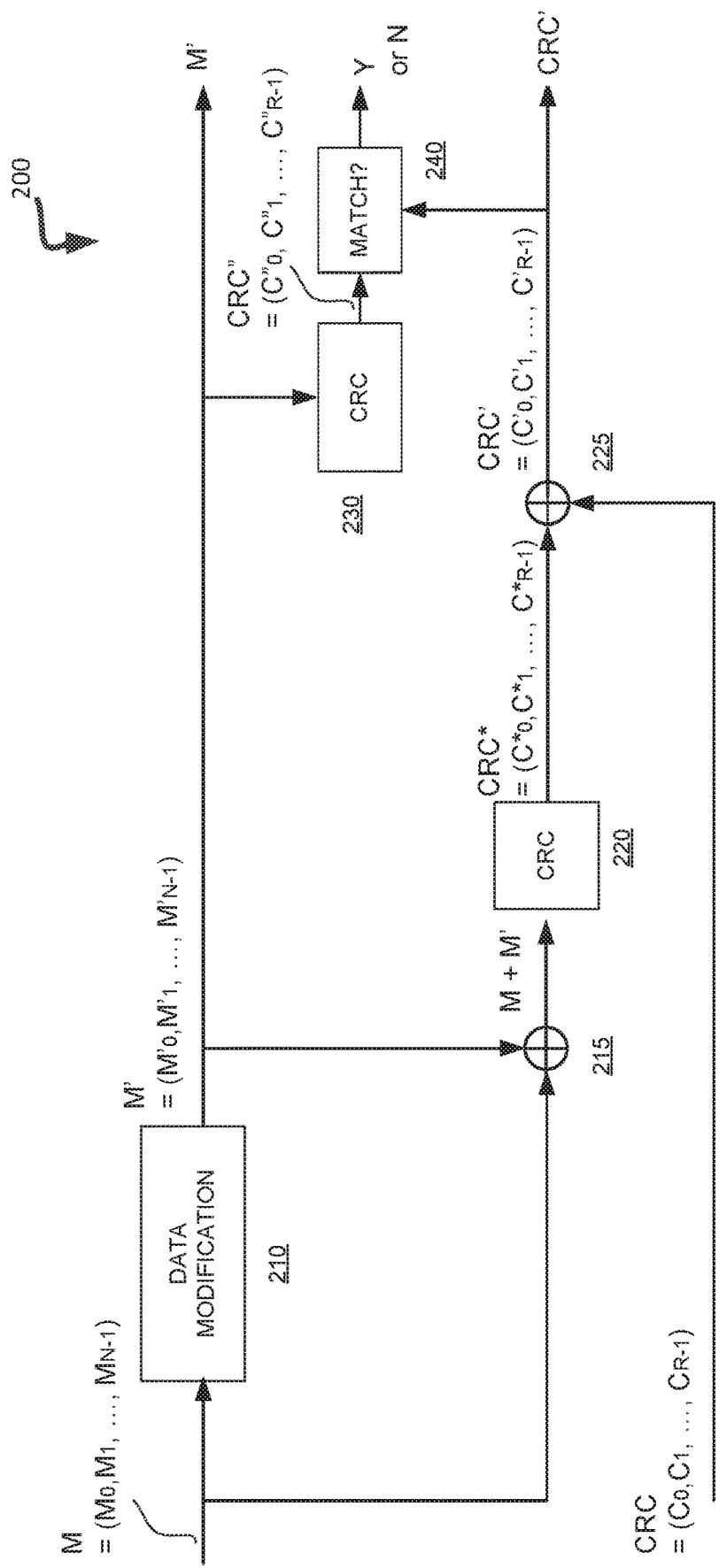
FIG. 2 is a flow diagram of an example method to detect whether an error has been introduced during encryption of data.

FIG. 2 is a flow diagram of an example method 200 to detect whether an error has been introduced during encryption of data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives a message data (e.g., M) from the host system 120. In some embodiments, the message data can include N bits of binary data, such as $M_0$, $M_1$, and etc. The processing device can receive the message data as a part of a write request from the host system 120 to store the message data. In some embodiments, the processing device can receive the message data and error-checking data (e.g., CRC) of the message data together in data package. The data package can have the error-checking data appended to the message data. In such a case, the processing device can extract the message data and the error-checking data from the data package. The error-checking data can include R bits of binary data, such as $C_0$, $C_1$, and etc.

Further, at operation 210, the processing device modifies the message data. In some embodiments, the processing device encrypts the message data to generate the encrypted data, M'. The resulting encrypted data can also have binary numbers with the same N number of bits. Then, the processing device stores the encrypted data. This encryption process is to securely store the message data in response to the write operation from the host system 120. When the host system 120 requests to access the message data, the processing device decrypts the encrypted data to return the message data to the host system 120, as will be described below with respect to FIG. 3. Furthermore, the processing device can create a copy of the original message data for operation 215. In addition, at operation 210, the processing device can generate a metadata representing a type of modification performed on the original message data M. The processing device can associate the modified message data M' with the original message data M for retrieval using the metadata.

After modifying the message data, at operation 215, the processing device combines the original message data M and the encrypted data M'. Before modifying the original message data M, the processing device can create a copy of the original message data M and use this copy to be combined with the encrypted data M'. In some embodiments, the processing device can compute a difference between the two data, M and M' to combine the two data. In particular, the processing device can apply an exclusive or (XOR) logic function to the two binary data M and M'. In further embodiments, the processing device can delete the copy of the original data M after performing operation 215.

At operation 220, the processing device applies a cyclic redundancy check (CRC) operation on the difference between the original data M and modified data M'. As a result, the processing device generates error-checking data (e.g., CRC*). In some embodiments, CRC* can have R bits of binary data, such as $C^*_0$, $C^*_1$, and etc. The processing device can use CRC* as an incremental error-checking data for computing error-checking data (e.g., CRC') of the modified data M' as will be described below with respect to operation 225. The incremental error-checking data used herein, refers to error-checking data (e.g., a CRC code calculated from the CRC operation) used to incrementally update error-checking data corresponding to an original data to arrive at error-checking data of data changed from the original data.

At operation 225, the processing device receives the error-checking data (e.g., CRC) of the original message data, M. The processing device can receive the error-checking data from the host system or can generate the error-checking data by performing the CRC operation on the received message data M. Then, the processing device updates the error-checking data (e.g., CRC) of the original message data M with the incremental error-checking data (e.g., CRC*) by determining a difference between the two error-checking data. Similar to operation 215, the processing device can determine the difference between the two error-checking data CRC and CRC* using the XOR logic function. By updating the error-checking data CRC corresponding to the original message data, the processing device generates error-checking data (e.g., CRC') for the modified data M'. That is, the updated error-checking data is the error-checking data (e.g., CRC') corresponding to the modified data, M'. Subsequently, the processing device can use CRC' to detect whether there is any error introduced during the encryption as will be described below with respect to operations 230 and 240. Such an error may have been caused by noise or other such impairments (e.g., an alpha particle emitted by packaging materials of the memory sub-system 110 that can cause a value or bit of data stored in a memory cell to switch from a '0' value to a '1' value or vice versa) when storing the data and/or retrieving the stored data.

At operation 230, the processing device applies the CRC operation to the encrypted data M'. In some embodiments, the resulting error-checking data CRC" can have R bits of binary data. Any error-checking data generated from the CRC operation would have the same number of bits, R.

Then, at operation 240, the processing device detects whether an error has been introduced during the encryption at operation 210 based on the two error-checking data, CRC' and CRC". If the two error-checking data have the same value, then the processing device can determine that the encrypted data M' is valid. Otherwise, if the two-error-checking data does not match, the processing device can determine that the encrypted data M' is not valid due to an error introduced during the encryption at operation 210. As such, by updating the error-checking data (e.g., CRC) of the original data M based on the incremental error-checking data (e.g., CRC*), the processing device can generate the error-checking data (e.g., CRC') corresponding the modified data M' to be used to detect any error introduced during the modification at operation 210.

In response to determining that the encrypted data M' is valid, the processing device can store the encrypted data M' with its corresponding error-checking data CRC' in a memory component. In such a case where the CRC" matches with CRC', the processing device can store CRC" instead of CRC'. In further embodiments, the processing device can modify the received data (e.g., M) multiple times. In such a case, the processing device can perform the method 200 each time a modification is performed in order to ensure integrity of modified data and accordingly perform any corrective action.

Figure 3:
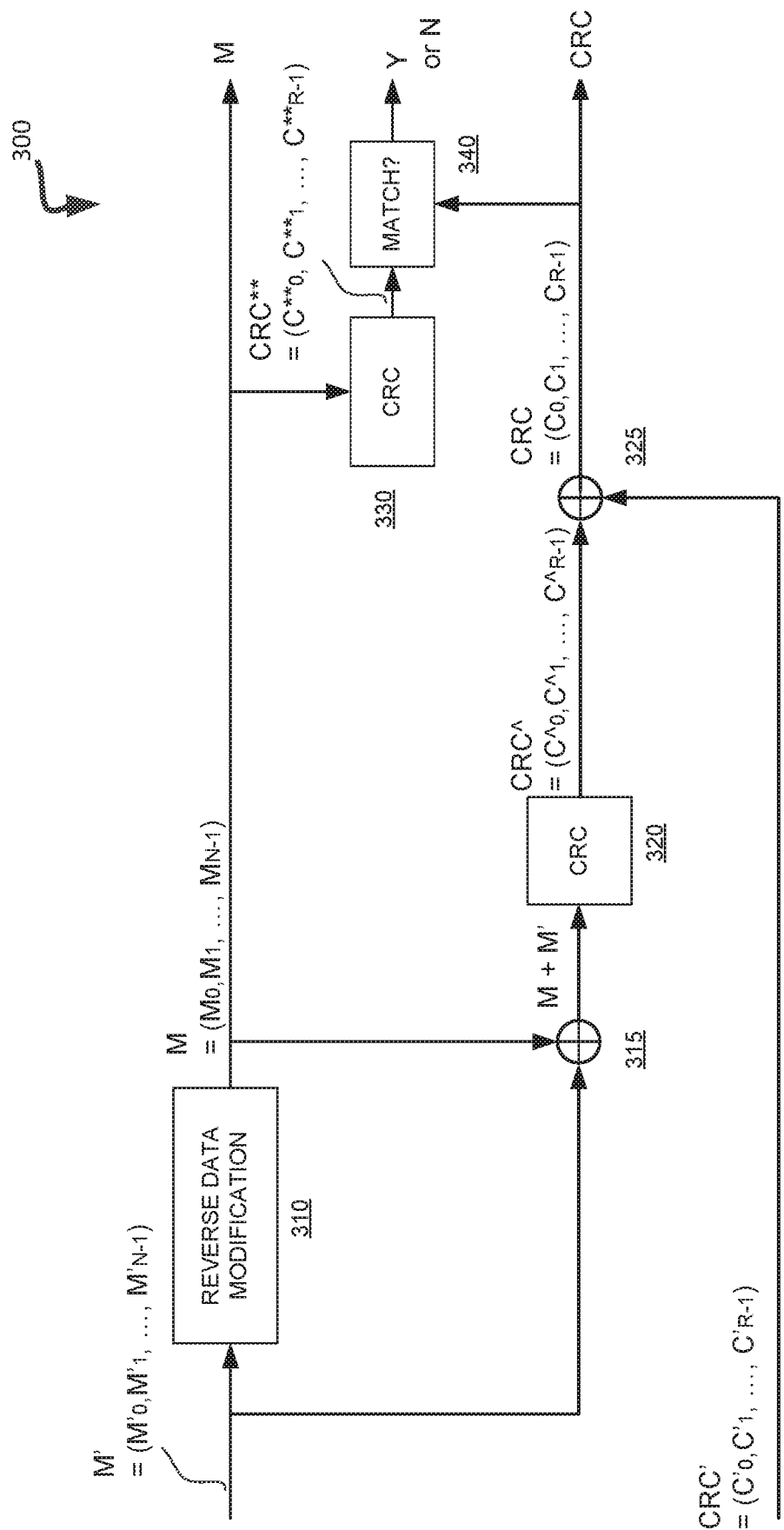
FIG. 3 is a flow diagram of an example method to detect whether an error has been introduced during decryption of data, in accordance with some embodiments of the present disclosure.

FIG. 3 is a flow diagram of an example method 300 to detect whether an error has been introduced during decryption of data, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device receives an encrypted message data. In some embodiments, the processing device can retrieve the encrypted message data M' from the method 200 stored in a memory component 112. In some embodiments, the processing device can read the stored data, M', in response to a request from the host system 120. The request may be associated with the request to store M in FIG. 2. That is, the host system 120 can send a read operation to the processing device to retrieve the data, M, that was transmitted to the processing device for storage. The host system 120 may not be aware of the encryption performed to M. Accordingly, in response to the retrieval request from the host system 120, the processing device can reverse or undo the modification (i.e., decrypt) the stored data M'. In order to determine how to reverse-modify or undo the modification, the processing device can identify, from the metadata associated with the modified data M', a type of modification performed on the original data M. Then, the processing device can determine an operation to change the modified data M' back to the original data M. For example, if the original data M from FIG. 2 has been encrypted to M', then the processing device can decrypt the encrypted data M' to obtain the original data M. As a result, both the encrypted data M' and decrypted data M have the same number of bits, N. Once the modified data M' is changed back to the original data M, the processing device provides the original data M to the host system 120 in response to the read operation (unless an error is detected in the reverse-modification process as will be described below with respect to operation 340).

At operation 315, the processing device determines a difference between the encrypted data M' and decrypted data M. Similar to operation 215, the processing device can apply the XOR logic function to both data to determine the difference between the data.

At operation 320, the processing device performs the CRC operation on the difference determined from operation 315. As a result, the processing device generates an incremental error-checking data (e.g., CRC^) that is to be used to determine error-checking data for the decrypted data M as will be described below at operation 325.

At operation 325, the processing device receives error-checking data (e.g., CRC') corresponding to the retrieved data M'. The processing device can retrieve CRC' that has been stored in the memory component 112 in association with the modified data M'. Then, the processing device can update the error-checking data (e.g., CRC') corresponding to the modified data M' by combining the error-checking data CRC' with the incremental error-checking data CRC^. Both error-checking data can be a binary number and have the same number of bits, R. As such, in some embodiments, the processing device can combine the two error-checking data using the XOR logic function. Therefore, the processing device generates error-checking data (e.g., CRC) for the decrypted data M from the resulting product of the XOR logic function. In some embodiments, CRC can be a binary number with R number of bits. The processing device can provide the host system 120 with the error-checking data of the decrypted data M in response to the retrieval request.

At operation 330, the processing device applies the CRC operation to the decrypted data M and generates error-checking data (e.g., CRC). At operation 340, in order to detect whether an error was introduced during the reverse modification or decryption at operation 310 or whether the reverse-modified data M contains an error, the processing device determines whether the error-checking data CRC of the reverse-modified data M matches the error-checking data CRC determined by updating the error-checking data CRC' of the modified data M' with the incremental error-checking data CRC^. If the two error-checking data CRC and CRC** match, the processing device can validate that the decrypted data M does not contain an error. In such a case, the decrypted data M in FIG. 3 should be the same as the original data M from FIG. 2 received from the host system 120. On the other hand, if the processing determines that the two error-checking data do not match, then the processing device can notify the host system 120 of a failure to retrieve the requested data or return to operation 310. In further embodiments, the processing device can perform the method 300 multiple times, if multiple modifications have been applied to the original data M received from the host system 120.

Figure 4:
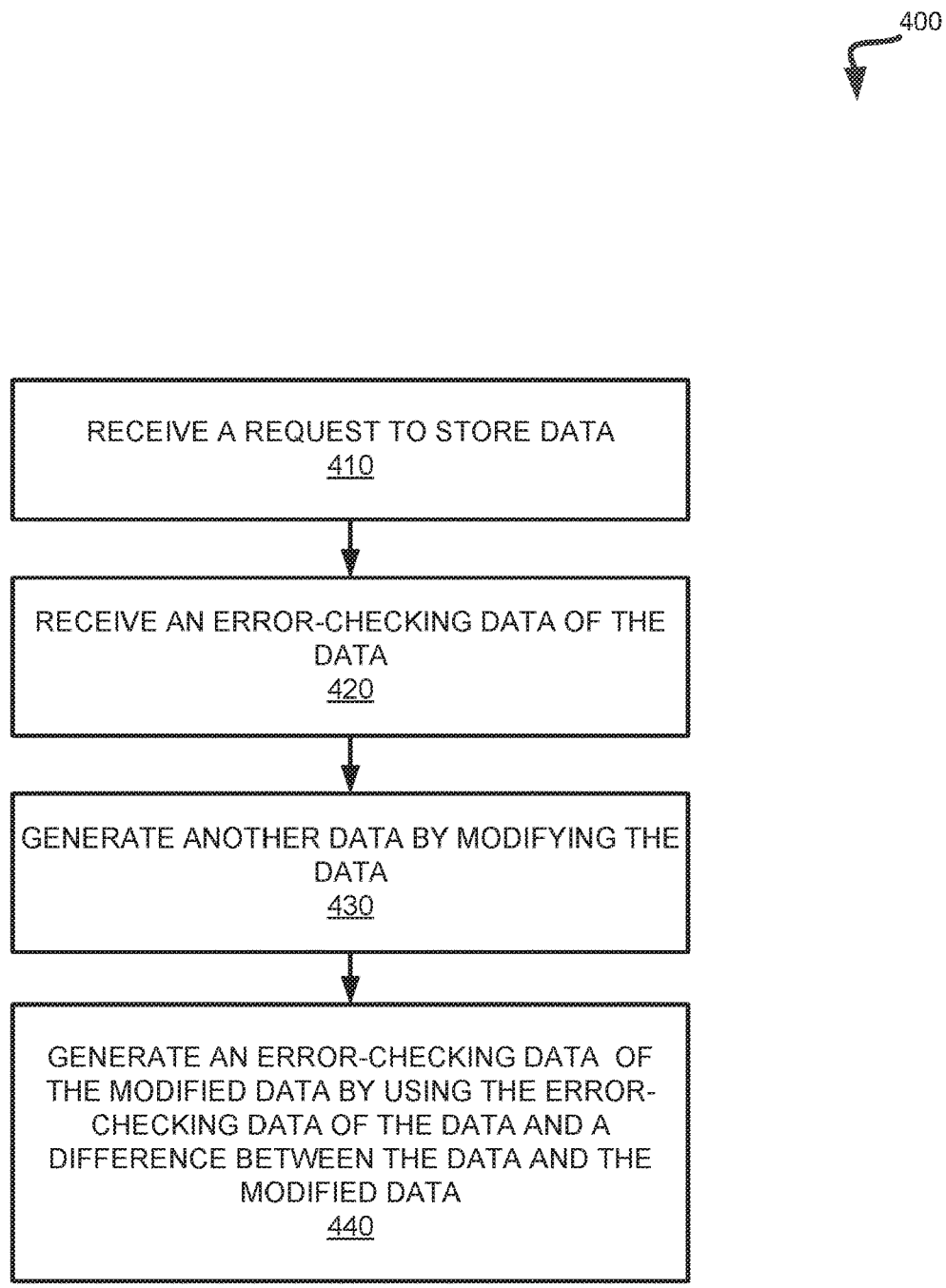
FIG. 4 is a flow diagram of an example method to generate error-checking data, in accordance with some embodiments of the present disclosure.

FIG. 4 is a flow diagram of an example method 400 to generate error-checking data, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives a request to store data (e.g., M in FIG. 2). For example, the processing device can receive a request to store M as provided by the host system 120. In other embodiments, the processing device can receive the request from the memory sub-system 110.

At operation 420, the processing device receives the data (e.g., M) and error-checking data (e.g., CRC in FIG. 2) of the data. In some embodiments, the processing device can receive data with the request. The processing device can receive the data from the host system 120 or the memory sub-system 110. The data can be in a form of a binary number. The error-checking data can also be in a form of a binary number. In some embodiments, the error-checking data can be a cyclic redundancy check (CRC) code that is generated by applying the CRC operation to the received data. Further, the error checking data can be appended to the data received. In such a case, the processing device can read the error checking data (e.g., CRC) from data package containing the data (e.g., M) and the corresponding error checking data (e.g., CRC). In some embodiments, the processing device can receive the error-checking data from the host system 120 or the memory sub-system 110. In some other embodiments, the processing device can perform the CRC operation on the data received to generate the error-checking data for operation 420. In further embodiments, the processing device can create a copy of the received data to perform a corrective action in case an error is detected in relation to operation 430 as will be described below.

At operation 430, the processing device generates another data (e.g., M' in FIG. 2) by modifying the data. The processing device can modify the data while maintaining the same data size. For example, the processing device can encrypt M and generate M', which is the encrypted M having the same number of bits as that of M. In some embodiments, the processing device can identify a type of modification (e.g., encryption) and store the modification type along with M', for example, using a metadata.

At operation 440, the processing device generates error-checking data (e.g., CRC' in FIG. 2) of the modified data (e.g., M') by using the error-checking data (e.g., CRC) of original data (e.g., M) and a difference between the data (e.g., M) and the modified data (e.g., M'). That is, the processing device can update the error-checking data (e.g., CRC) received at operation 420 in order to generate the error-checking data of the modified data. The processing device can update the error-checking data of operation 420 based on a combination of the data received (e.g., M) and the data (e.g., M') generated at operation 430. For example, the processing device can use an incremental error-checking data (e.g., CRC* in FIG. 2) generated from the combination of the original data M and the modified data M'. An incremental error-checking data used herein, refers to error-checking data (calculated from the CRC operation) used to incrementally update error-checking data of an original data to arrive at error-checking data of modified data to validate the modified data generated from data modification of the original data to the modified data. In some embodiments, the processing device can combine the original data and modified data using a difference between the two data. The processing device can determine the difference using the XOR logic function. Once the processing device determines a difference between M and M', the processing device can apply the CRC operation on the difference to generate the incremental error-checking data, CRC*. After determining the incremental error-checking data (e.g., CRC*), the processing device can proceed to generate error-checking data (e.g., CRC') of the modified data (e.g., M') by updating the error-checking data (e.g., CRC) of the original data (e.g., M) with the incremental error-checking data (e.g. CRC*). To update the error-checking data (e.g., CRC) of the original data (e.g., M), the processing device can combine the error-checking data (e.g., CRC) of the original data (e.g., M) with the incremental error-checking data (e.g. CRC*). In some embodiments, the processing device can perform the XOR logic function on the two CRCs (e.g., CRC and CRC*). As such, in some embodiments, the processing device can combine the CRC and CRC* using their difference determined by the XOR logic function.

In some further embodiments, the processing device can determine whether an error has been introduced during the modification of operation 430 by comparing the error-checking data (e.g., CRC') of the modified data (e.g., M') from operation 440 with error-checking data (e.g., CRC" in FIG. 2) generated from the CRC operation of the modified data (e.g., M'). An error can be caused by any impairment that induces a state of a memory cell in a memory component 112 to be flipped to an opposite state (e.g., from a '1' value to a '0' value and vice ver. In some embodiments, the processing device can compare the error-checking data (e.g., CRC') updated from the error-checking data (e.g., CRC) of the original data (e.g., M) using the incremental error-checking data (e.g., CRC*), with the error-checking data (e.g., CRC") computed from the CRC operation of the modified data (e.g., M'). Based on the comparison, the processing device can determine whether the two error-checking data match. In comparing the two CRCs, the processing device can determine whether a value represented by binary numbers of each CRC is the same.

In response to determining that CRC' matches CRC", the processing device can determine that M' does not contain the error. Then, the processing device can store M' with the corresponding error checking data (e.g., CRC'). In storing M', the processing device can associate M' with the original data, M received. The processing device can use an identifier or a metadata for the association. In this way, when the processing device receives a request from the host system 120 to retrieve M, the processing device can access M' based on the association.

On the other hand, in case CRC' does not match CRC", the processing device can determine that M' contains the error. Then, the processing device can perform operation 430 again on a copy of the received data as a corrective action. In some embodiments, the processing device can notify the host system 120 that M cannot be stored.

Figure 5:
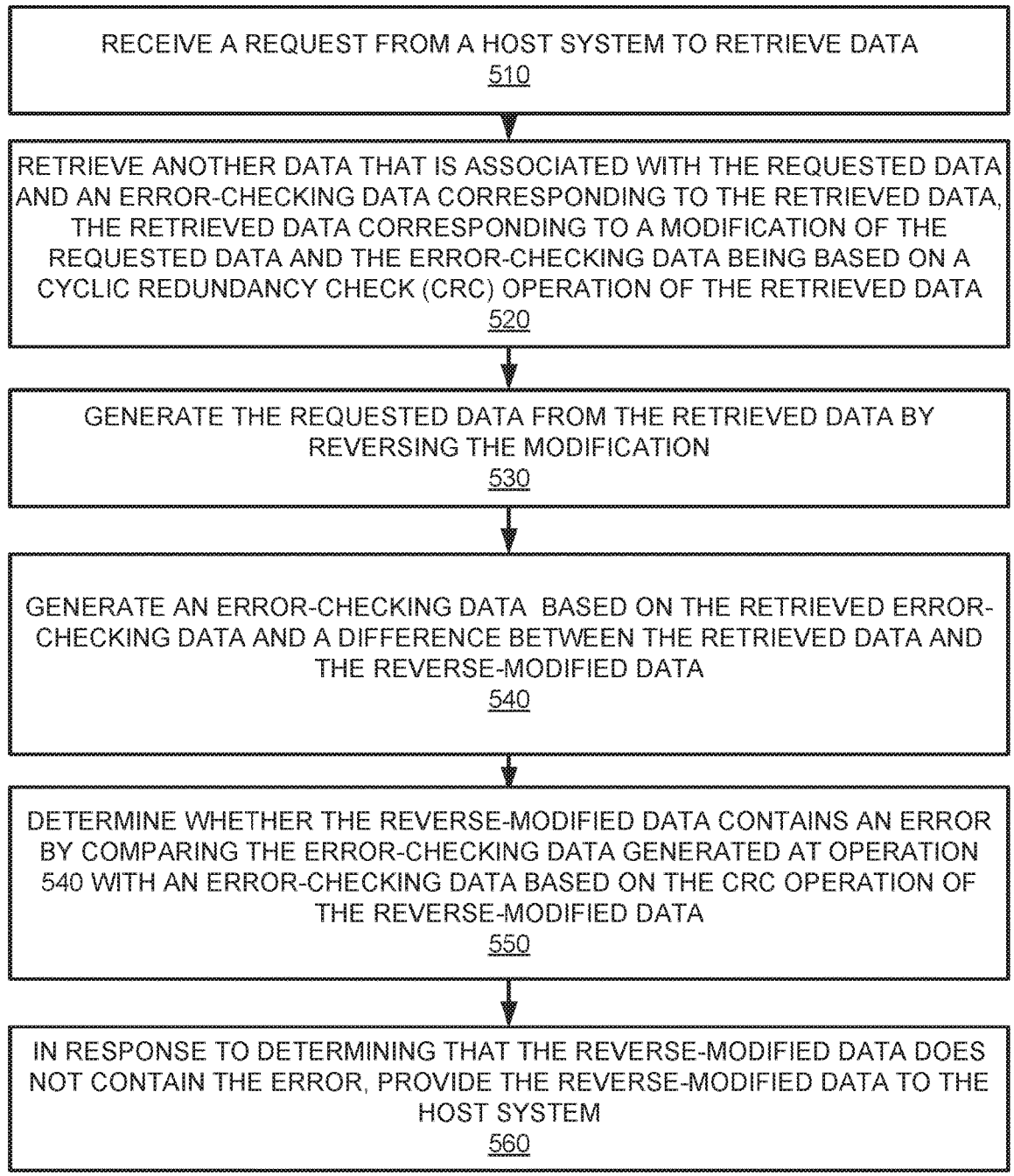
FIG. 5 is a flow diagram of an example method to detect an error in data requested for retrieval by using error-checking data, in accordance with some embodiments of the present disclosure.

FIG. 5 is a flow diagram of an example method 500 to detect an error in data requested for retrieval, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device receives a request from a host system to retrieve data (e.g., M in FIG. 3). At operation 520, the processing device, retrieves another data (e.g., M' in FIG. 3) that is associated with the requested data and error-checking data corresponding to the retrieved data. In some embodiments, the retrieved data (e.g., M' in FIG. 3) can correspond a modification of the data (e.g., M in FIG. 3) requested to be retrieved. For example, the processing device can receive data (e.g., M in FIG. 2) from the host system 120 to store and subsequently receive a request from the host system 120 to retrieve the data (e.g., M in FIG. 3). However, to store the data (e.g., M in FIG. 2) from the host system 120, the processing device can modify (e.g., encrypt) the data (e.g., M in FIG. 2) from the host system 120 to modified data (e.g., M' in FIG. 2) and store the modified data (e.g., M' in FIG. 2) instead. Thus, upon receiving a request to retrieve the data (e.g., M in FIG. 3) from the host system 120, the processing device first accesses the modified data (e.g., M' in FIG. 2) stored. As will be discussed below, the data (e.g., M in FIG. 2) received from the host system 120 can be different from the data (e.g., M in FIG. 3) recovered because the recovered data (e.g., M in FIG. 3) can contain an error.

Moreover, at operation 520, the processing device can retrieve error-checking data (e.g., CRC' in FIG. 3) that is based on the CRC operation of the retrieved data (e.g., M'). The CRC' can be stored with M' by being appended to M'. In some embodiments, both the retrieved data and the error-checking data can be in a form of binary data.

At operation 530, the processing device generates the requested data (e.g., M in FIG. 3) from the retrieved data (e.g., M'), by reversing the modification. In some embodiments, the processing device can reverse the modification by modifying the retrieved data (e.g., M') back to the requested data (e.g., M) while maintaining the same data size. The processing device can determine how to modify the retrieved data (e.g., M') back based on a metadata associated with M'. For example, the processing device can identify from the metadata of M', a type of modification (e.g., encryption) performed on the data received from the host system 120. Then, the processing device can determine an operation (e.g., decryption) to undo or reverse the modification (e.g., encryption) based on the type of modification determined from the metadata of M'.

At operation 540, the processing device generates error-checking data (e.g., CRC in FIG. 3) based on the retrieved error-checking data (e.g., CRC') and a difference between the data (e.g., M) and the retrieved data (e.g., M'). Similar to operation 440, the processing device can update the retrieved error-checking data (e.g., CRC') based on a combination of the retrieved data (e.g., M') and the reverse-modified data (e.g., M) for the retrieval request. The processing device can update the retrieved error-checking data (e.g., CRC') using an incremental error-checking data (e.g., CRC^ in FIG. 3). For example, the processing device can generate the incremental error-checking data (e.g., CRC^), based on the reverse-modified data (e.g., M) and the retrieved data (e.g., M'). The processing device can determine a difference between M and M' using the XOR logic function and applying the CRC operation on the difference to generate the incremental error-checking data (e.g., CRC^). After determining the incremental error-checking data, CRC^, the processing device can proceed to generate error-checking data (e.g., CRC) of the reverse-modified data (e.g., M) by updating the retrieved error-checking data (e.g., CRC') with the incremental error-checking data (e.g., CRC^). For example, the processing device can combine the retrieved error-checking data (e.g., CRC') with the incremental error-checking data, CRC^. The processing device can perform the XOR logic function on the two CRCs (e.g., CRC^ and CRC') for the combination. The updated error-checking data (e.g., CRC') would correspond to the error-checking data (e.g., CRC) of the reverse-modified data (e.g., M).

At operation 550, the processing device determines whether the reverse-modified data (e.g., M) contains an error by comparing the generated error-checking data (e.g., CRC), with error-checking data (e.g., CRC) based on the CRC operation on the reverse-modified data (e.g., M). For example, the processing device can compare the two CRCs and determine whether the two CRCs have the same value. In response to determining that CRC and CRC do not match, the processing device can determine that the reverse-modified data M contains the error. In some embodiments, the processing device can return to operation 530 to generate M again. In other embodiments, the processing device can notify the host system 120 of the error or a failure to retrieve the requested data. On the other hand, the processing device can determine that CRC matches with CRC**. In such a case, the processing device determines that M not contain the error.

At operation 560, the processing device, in response to determining that the reverse-modified data does not contain the error, provides the reverse-modified data (e.g., M) to the host system 120 based on the request.

In further embodiments, the processing device can provide both the reverse-modified data and the corresponding error-checking data to the host system 120. In response, the host system 120 can determine whether the received data from the processing device is the same as the data provided to the processing device to be store, by comparing the received error-checking data with error-checking data newly computed using the CRC operation on the received data.

Figure 6:
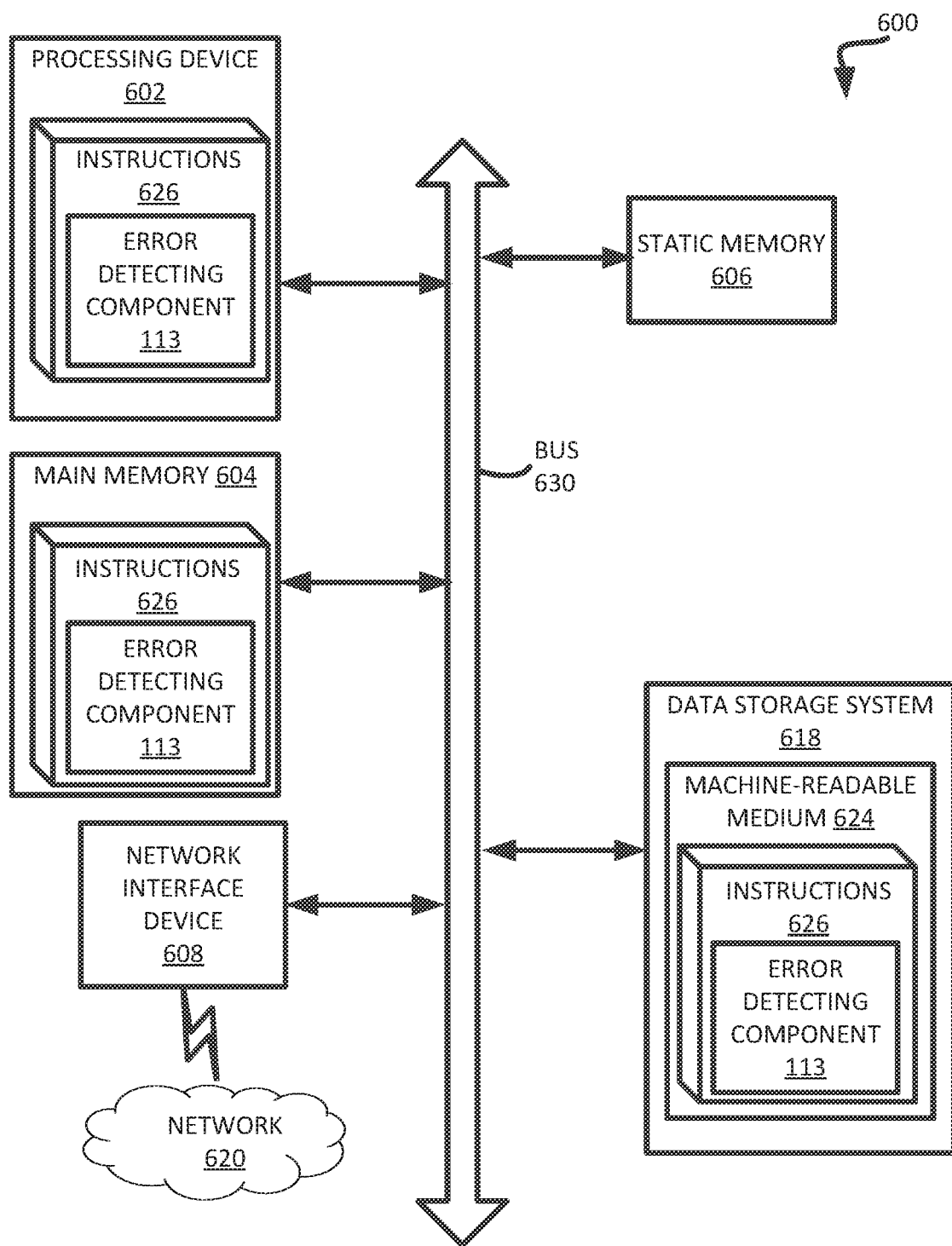
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error-detecting component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an error-detecting component (e.g., the error-detecting component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory component;
   a processing device, operatively coupled with the memory component, to:
   receive a request to store a first data;
   receive the first data and a first error-checking data, the first error-checking data being based on a cyclic redundancy check (CRC) operation of the first data;
   generate a second data by modifying the first data;
   generate a second error-checking data of the second data by using the first error-checking data and a difference between the first data and the second data; and
   determine whether the second data contains an error by comparing the second error-checking data with a third error-checking data generated from a CRC operation of the second data.

2. The system of claim 1, wherein to generate the second error-checking data, the processing device is to:
   update the first error-checking data based on a combination of the first data and the second data; and
   generate the second error-checking data by combining the first error-checking data and the updated first error-checking data.

3. The system of claim 2, wherein to update the first error-checking data, the processing device is to:
   determine the difference between the first data and the second data; and
   update the first error-checking data by applying a CRC operation to the difference between the first data and the second data.

4. The system of claim 1, wherein to determine whether the second data contains the error, the processing device is to:
   in response to determining that the second error-checking data matches the third error-checking data generated from the CRC operation of the second data, determine that the second data does not contain the error; and
   in response to determining that the second error-checking data does not match the third error-checking data generated from the CRC operation of the second data, determine that the second data contains the error.

5. The system of claim 4, the processing device is further to:
   in response to determining that the second data does not contain the error, store the second data in association with the second error-checking data.

6. The system of claim 1, wherein to modify the first data, the processing device is to modify the first data to the second data while maintaining the same data size.

7. A method comprising:
   receiving a request to store a first data;
   receiving the first data and a first error-checking data, the first error-checking data being based on a cyclic redundancy check (CRC) operation of the first data;
   generating a second data by modifying the first data;
   generating, by a processing device, a second error-checking data of the second data by using the first error-checking data and a difference between the first data and the second data; and
   determining whether the second data contains an error by comparing the second error-checking data with a third error-checking data generated from a CRC operation of the second data.

8. The method of claim 7, wherein the generating of the second error-checking data comprises:
   updating the first error-checking data a third error-checking data based on a combination of the first data and the second data; and
   generating the second error-checking data by combining the first error-checking data and the updated first error-checking data.

9. The method of claim 8, wherein the updating of the first error-checking data comprises:
   determining the difference between the first data and the second data; and
   updating the first error-checking data by applying a CRC operation to the difference between the first data and the second data.

10. The method of claim 9, wherein the determining of whether the second data contains the error comprises:
    in response to determining that the second error-checking data matches the third error-checking data generated from the CRC operation of the second data, determining that the second data does not contain the error; and
    in response to determining that the second error-checking data does not match the third error-checking data generated from the CRC operation of the second data, determining that the second data contains the error.

11. The method of claim 10, further comprising:
    in response to determining that the second data does not contain the error, storing the second data in association with the second error-checking data.

12. The method of claim 7, wherein the modifying of the first data comprises modifying the first data to the second data while maintaining the same data size.

13. A method comprising:
    receiving a request from a host system to retrieve a first data;
    retrieving a second data associated with the first data and a second error-checking data of the second data, the second data corresponding to a modification of the first data and the second error-checking data being based on a cyclic redundancy check (CRC) operation of the second data;

generating the first data from the second data by reversing the modification;

generating a first error-checking data that is based on the second error-checking data and a difference between the first data and the second data;

determining, by a processing device, whether the first data contains an error by comparing the first error-checking data with an error-checking data generated based on a CRC operation of the first data, wherein the determining of whether the first data contains the error comprises:

in response to determining that the first error-checking data matches the error-checking data generated based on the CRC operation of the first data, determining that the first data does not contain the error, and in response to determining that the first error-checking data does not match error-checking data generated based on the CRC operation of the first data, determining that the first data contains the error; and in response to determining that the first data does not contain the error, providing the first data to the host system.

14. The method of claim 13, wherein the generating of the first error-checking data comprises:

updating the second error-checking data based on a combination of the first data and the second data, the updated second error-checking data corresponding to the first error-checking data.

15. The method of claim 14, wherein the updating of the second error-checking data comprises:

determining the difference between the first data and the second data; and updating the second error-checking data by combining the second error-checking data with an error-checking data generated from a CRC operation of the difference between the first data and the second data.

16. The method of claim 13, further comprising:

in response to determining that the first data contains the error, notifying a failure to retrieve the first data to the host system.

17. The method of claim 13, wherein the reversing of the modification comprises modifying the second data back to the first data while maintaining the same data size.

* * * * *